(12) United States Patent
Banerjee et al.

(10) Patent No.: US 7,707,389 B2
(45) Date of Patent: Apr. 27, 2010

(54) MULTI-ISA INSTRUCTION FETCH UNIT FOR A PROCESSOR, AND APPLICATIONS THEREOF

(75) Inventors: Soumya Banerjee, San Jose, CA (US);
John L. Kelley, Madison, WI (US);
Ryan C. Kinter, Los Altos, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 413 days.

(21) Appl. No.: 10/698,061

(22) Filed: Oct. 31, 2003

(65) Prior Publication Data
US 2005/0177707 A1    Aug. 11, 2005

(51) Int. Cl.
G06F 9/30    (2006.01)
(52) U.S. Cl. .................................................... 712/209
(58) Field of Classification Search ................. 712/209, 712/206
See application file for complete search history.

(56) References Cited

U.S. PATENT DOCUMENTS

| | | |
|---|---|---|
| 3,543,245 A | 11/1970 | Nutter |
| 3,631,405 A | 12/1971 | Hoff et al. |
| 3,949,372 A | 4/1976 | Brioschi |
| 4,077,058 A | 2/1978 | Appell et al. |
| 4,084,235 A | 4/1978 | Hirtle et al. |
| 4,274,138 A | 6/1981 | Shimokawa |
| 4,575,797 A | 3/1986 | Gruner et al. |
| 4,774,652 A | 9/1988 | Dhuey et al. |
| 4,782,443 A | 11/1988 | Matsumoto |
| 4,835,734 A | 5/1989 | Kodaira et al. |
| 4,839,797 A | 6/1989 | Katori et al. |
| 4,868,740 A | 9/1989 | Kagimasa et al. |
| 4,876,639 A | 10/1989 | Mensch, Jr. |
| 5,193,158 A | 3/1993 | Kinney et al. |
| 5,280,593 A | 1/1994 | Bullions, III et al. |
| 5,307,504 A | 4/1994 | Robinson et al. |
| 5,335,331 A | 8/1994 | Murao et al. |
| 5,408,625 A * | 4/1995 | Narita et al. ................. 712/210 |

(Continued)

FOREIGN PATENT DOCUMENTS

EP    0 109 567 A2    5/1984

(Continued)

OTHER PUBLICATIONS

Computer Organization and Design by Hennessy and Patterson.*

(Continued)

Primary Examiner—Aimee J Li
(74) Attorney, Agent, or Firm—Sterne, Kessler, Goldstein & Fox P.L.L.C.

(57) ABSTRACT

A method and apparatus for recoding one or more instruction sets. An expand instruction and an expandable instruction are read from an instruction cache. A tag compare and way selection unit checks to verify each instruction is a desired instruction. An instruction staging unit dispatches the expand instruction to a first recoder and the expandable instruction to a second recoder of a recoding unit. At least one information bit based on the expand instruction is generated at the first recoder. The second recoder uses the at least one information bit generated at the first recoder to recode the expandable instruction, and the recoded expandable instruction is placed in an instruction buffer.

44 Claims, 14 Drawing Sheets

U.S. PATENT DOCUMENTS

| | | | |
|---|---|---|---|
| 5,420,992 A | 5/1995 | Killian et al. | |
| 5,438,668 A | 8/1995 | Coon et al. | |
| 5,463,700 A | 10/1995 | Nakazawa | |
| 5,467,134 A | 11/1995 | Laney et al. | |
| 5,481,684 A | 1/1996 | Richter et al. | |
| 5,481,693 A | 1/1996 | Blomgren et al. | |
| 5,519,873 A | 5/1996 | Butter et al. | |
| 5,542,059 A | 7/1996 | Blomgren | |
| 5,546,552 A | 8/1996 | Coon et al. | |
| 5,568,646 A | 10/1996 | Jaggar | |
| 5,574,887 A | 11/1996 | Fitch | |
| 5,574,927 A | 11/1996 | Scantlin | |
| 5,574,928 A | 11/1996 | White et al. | |
| 5,598,546 A | 1/1997 | Blomgren | |
| 5,619,665 A | 4/1997 | Emma | |
| 5,619,666 A | 4/1997 | Coon et al. | |
| 5,632,024 A | 5/1997 | Yajima et al. | |
| 5,638,525 A * | 6/1997 | Hammond et al. | 712/209 |
| 5,652,852 A | 7/1997 | Yokota | |
| 5,664,136 A | 9/1997 | Witt et al. | |
| 5,685,009 A | 11/1997 | Blomgren et al. | |
| 5,692,167 A * | 11/1997 | Grochowski et al. | 712/226 |
| 5,740,461 A | 4/1998 | Jaggar | |
| 5,758,112 A | 5/1998 | Yeager et al. | |
| 5,758,115 A | 5/1998 | Nevill | |
| 5,774,686 A | 6/1998 | Hammond et al. | |
| 5,781,750 A * | 7/1998 | Blomgren et al. | 712/209 |
| 5,794,010 A | 8/1998 | Worrell et al. | |
| 5,796,973 A | 8/1998 | Witt et al. | |
| 5,828,859 A | 10/1998 | Tanihira et al. | |
| 5,854,913 A | 12/1998 | Goetz et al. | |
| 5,867,681 A | 2/1999 | Worrell et al. | |
| 5,867,682 A | 2/1999 | Witt et al. | |
| 5,881,258 A * | 3/1999 | Arya | 712/209 |
| 5,896,519 A | 4/1999 | Worrell | |
| 5,905,893 A | 5/1999 | Worrell | |
| 5,954,830 A | 9/1999 | Ternullo, Jr. | |
| 6,012,138 A | 1/2000 | Worrell | |
| 6,021,265 A | 2/2000 | Nevill | |
| 6,021,484 A * | 2/2000 | Park | 712/41 |
| 6,047,368 A * | 4/2000 | Arya | 712/215 |
| 6,167,505 A * | 12/2000 | Kubota et al. | 712/210 |
| 6,405,303 B1 * | 6/2002 | Miller et al. | 712/210 |
| 6,430,674 B1 * | 8/2002 | Trivedi et al. | 712/43 |
| 6,651,160 B1 | 11/2003 | Hays | |
| 6,961,843 B2 * | 11/2005 | O'Connor et al. | 712/208 |
| 7,194,601 B2 * | 3/2007 | Shelor | 712/209 |
| 2002/0004897 A1 * | 1/2002 | Kao et al. | 712/227 |
| 2002/0056036 A1 * | 5/2002 | Topham | 712/209 |
| 2004/0024992 A1 * | 2/2004 | Ku | 712/210 |
| 2004/0199747 A1 * | 10/2004 | Shelor | 712/209 |
| 2004/0205322 A1 * | 10/2004 | Shelor | 712/209 |

FOREIGN PATENT DOCUMENTS

| | | |
|---|---|---|
| EP | 0 169 565 A2 | 1/1986 |
| EP | 0 199 173 A2 | 10/1986 |
| EP | 0 324 308 A2 | 7/1989 |
| GB | 2 016 755 A | 9/1979 |
| GB | 2 284 492 A | 6/1995 |
| GB | 2 289 353 A | 11/1995 |
| GB | 2 290 395 A | 12/1995 |
| WO | WO 95/30187 A1 | 11/1995 |
| WO | WO 95/30188 A1 | 11/1995 |
| WO | WO 96/24895 A1 | 8/1996 |

OTHER PUBLICATIONS

Bandyopadhyay, A. and Zheng, Y.F., "Combining Both Micro-Code And Hardwired Control in RISC," 5 pages, (published in ACM SIGARCH Computer Architecture News, vol. 15, Issue 4, pp. 11-15 (Sep. 1987)).

Hayashi, T. et al., "A 5.6-MIPS Call-Handling Processor for Switching Systems," *IEEE Journal of Solid-State Circuits*, vol. 24, No. 4, IEEE, pp. 945-950 (Aug. 1989).

"High Performance Dual Architecture Processor," *IBM Technical Disclosure Bulletin*, vol. 36, No. 2, IBM Corp., pp. 231-234 (Feb. 1993).

McNeley, K.J. and Milutinovic, V.M., "Emulating a Complex Instruction Set Computer with a Reduced Instruction Set Computer," *IEEE Micro*, IEEE, pp. 60-72 (Feb. 1987).

Sweetman, D., *See MIPS Run*, Morgan Kaufman Publishers, Inc., ISBN 1-55860-410-3, pp. vii-xiv and 423-425 (1999).

Turley, J., "LSI's TinyRisc Core Shrinks Code Size: Code-Compaction Technique Squeezes MIPS Instructions Into 16 Bits," *Microprocessor Report*, Microdesign Resources, pp. 40-43 (Oct. 28, 1996).

*MIPS32 Architecture for Programmers vol. IV-a: The MIPS16e Application-Specific Extension to the MIPS32 Architecture*, Rev. 2.00, MIPS Technologies, Inc. (2003).

Notification of the First Office Action, dated Jan. 9, 2009, for Chinese Patent Appl. No. 200510067702.2, 6 pages (includes Chinese and English language versions).

Hennessy, J.L. and Patterson, D.A., *Computer Architecture: A Quantitative Approach*, Third Edition, Morgan Kaufman Publishers, San Francisco California, entire book submitted (2003).

* cited by examiner

MULTI-ISA INSTRUCTION FETCH UNIT FOR A PROCESSOR, AND APPLICATIONS THEREOF

FIELD OF THE INVENTION

The present invention relates generally to the field of computer architecture. More particularly, the present invention relates to the recoding of instructions.

BACKGROUND OF THE INVENTION

It is known that computer systems (e.g., main frames, personal computers, microprocessors, etc.) may be designed to execute instructions from one or more than one instruction set. In computer systems designed to execute instructions from more than one instruction set, for example, a first instruction set might be optimized for fast execution on a target system. However, instructions from this first set might have a relatively wide format (e.g., 32 or 64 bits in width) and therefore use a relatively large amount of memory space for storage. Hence, a second instruction set could be made available that is optimized for using less memory space through the use of a narrower instruction width format (e.g., 8 or 16 bits in width). Such instructions may execute routines slower than those from the first instruction set (because more and possibly different instructions are required to carry out the same function), but the narrower format contributes to a potential reduction in overall memory space required.

Additionally, a third instruction set could be made available to provide backwards compatibility to earlier generation machines that, again, may utilize instruction width formats of differing size (e.g., older 16-bit machines). Moreover, a fourth (or more) instruction set could be made available to provide upwards compatibility to new developments in instruction sets that may also require different instruction width formats (e.g., 8-bit JAVA bytecodes). The foregoing examples, of course, are not exhaustive.

In order for a single computer system to support different instruction sets as described above, the system requires the capability to accommodate different instruction sets having potentially different instruction width formats. One way that such capability has been achieved in the past is by mapping one instruction set onto another, which allows a single decoder to be used for the different instruction width formats. Such mapping is possible, for example, where the one instruction set is a subset of the other. However, this is a significantly limiting feature because most instruction sets are not so related.

Moreover, this issue is made more complex in computer systems that simultaneously fetch a plurality of instructions for processing. Mapping may be achieved in such a system through a series of operations carried out in one or more pipeline stages (of a pipelined processor). These operations include reading a plurality of instructions from a cache memory, processing such instructions by comparing the tags of each instruction, selecting a desired instruction from the plurality (based on the tag compare) and then mapping the desired instruction. However, in such a serial mapping method, the processing of these instructions results in an increased branch penalty and/or cycle time.

Therefore, what is needed is a more efficient way of processing instructions for execution by a processor of a computer system.

BRIEF SUMMARY OF THE INVENTION

In one embodiment of the present invention, a computer architecture is provided for recoding. In embodiments, the architecture includes at least two interconnected recoders that are used to recode instructions. These recoders operate both independently and together when recoding instructions. As described herein, the present invention is embodied in various architectures, systems, apparatuses, computer program codes, and methods.

In embodiments of the present invention, the architecture is responsible, for example, for fetching instructions from an instruction cache, recoding instructions, and providing instructions to other pipe stages of a computer system. As described herein, in embodiments of the architecture, one or more instructions and cache tags are read from an instruction cache such as, for example, an on-chip memory block with multi-way associativity. The number of instructions and cache tags that are read from the instruction cache is dependent upon available bandwidth. After the instructions and cache tags are read, a tag compare and way selection unit checks the tags to verify that each desired instruction is available (i.e., present in the cache). An instruction staging unit stages and dispatches the fetched instructions to an instruction recoding unit. Because multiple instructions can be read from the instruction cache during a single clock cycle, the multiple instructions are staged and dispatched to the instruction recoding unit. The instruction recoding unit recodes the instructions received from the instruction staging unit to form recoded instructions that can be subsequently decoded and executed. In accordance with an embodiment of the present invention, the instruction recoding unit includes at least two interconnected recoders for recoding instructions. The recoded instructions produced by the instruction recoding unit are stored in an instruction buffer. This instruction buffer isolates the instruction fetch pipe stage operations of a computer system embodying the architecture from the operations of the other pipe stages of the computer system. In embodiments, an instruction bypass unit allows instructions to be passed directly from the tag compare and way selection unit to the instruction buffer.

Further embodiments, features, and advantages of the present invention are described in detail below with reference to the accompanying drawings.

BRIEF DESCRIPTION OF THE DRAWINGS/FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

Figure 1A:
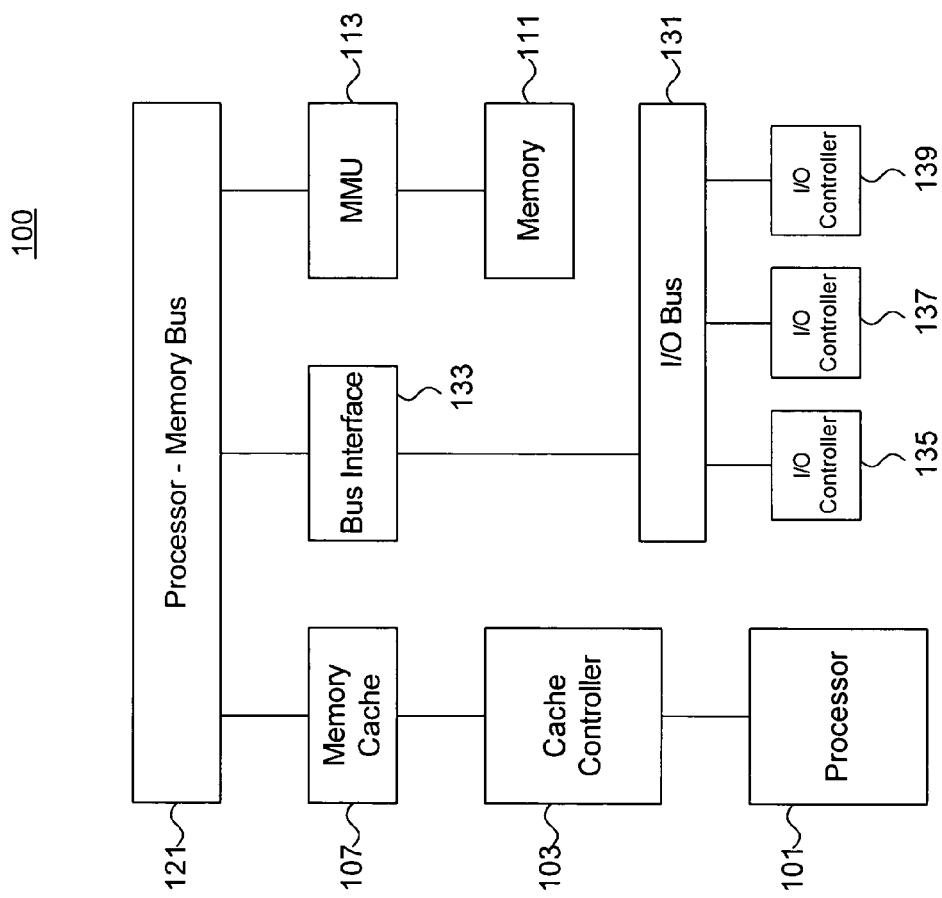
FIG. 1A is a block diagram illustrating an example computer system.
Figure 1B:
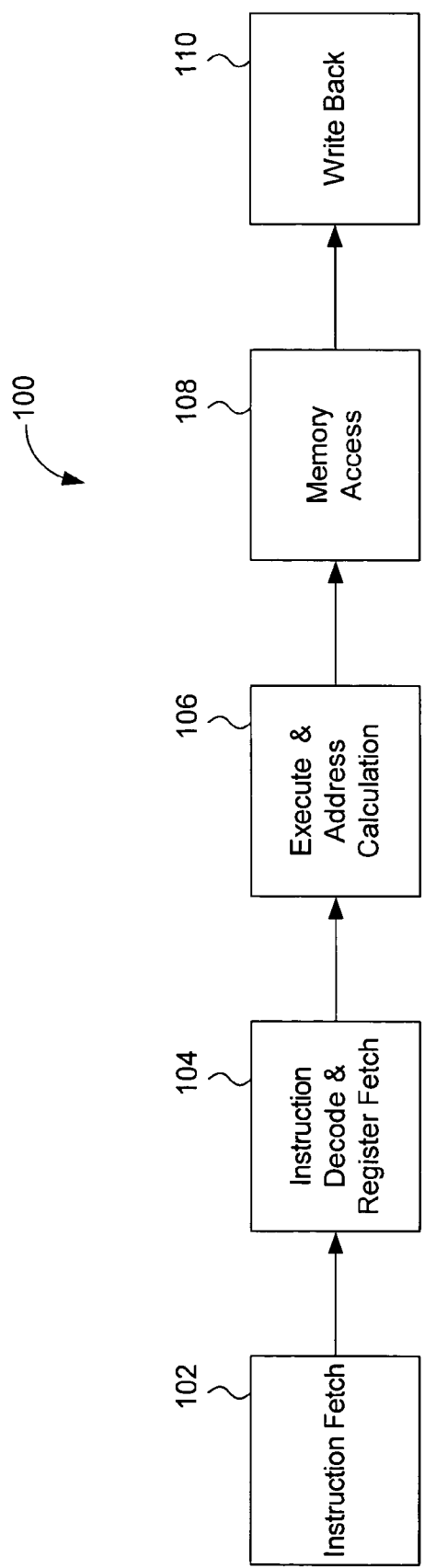
FIG. 1B is a block diagram illustrating a series of pipeline or pipe stage operations carried out by the computer system of FIG. 1A.
Figure 3:
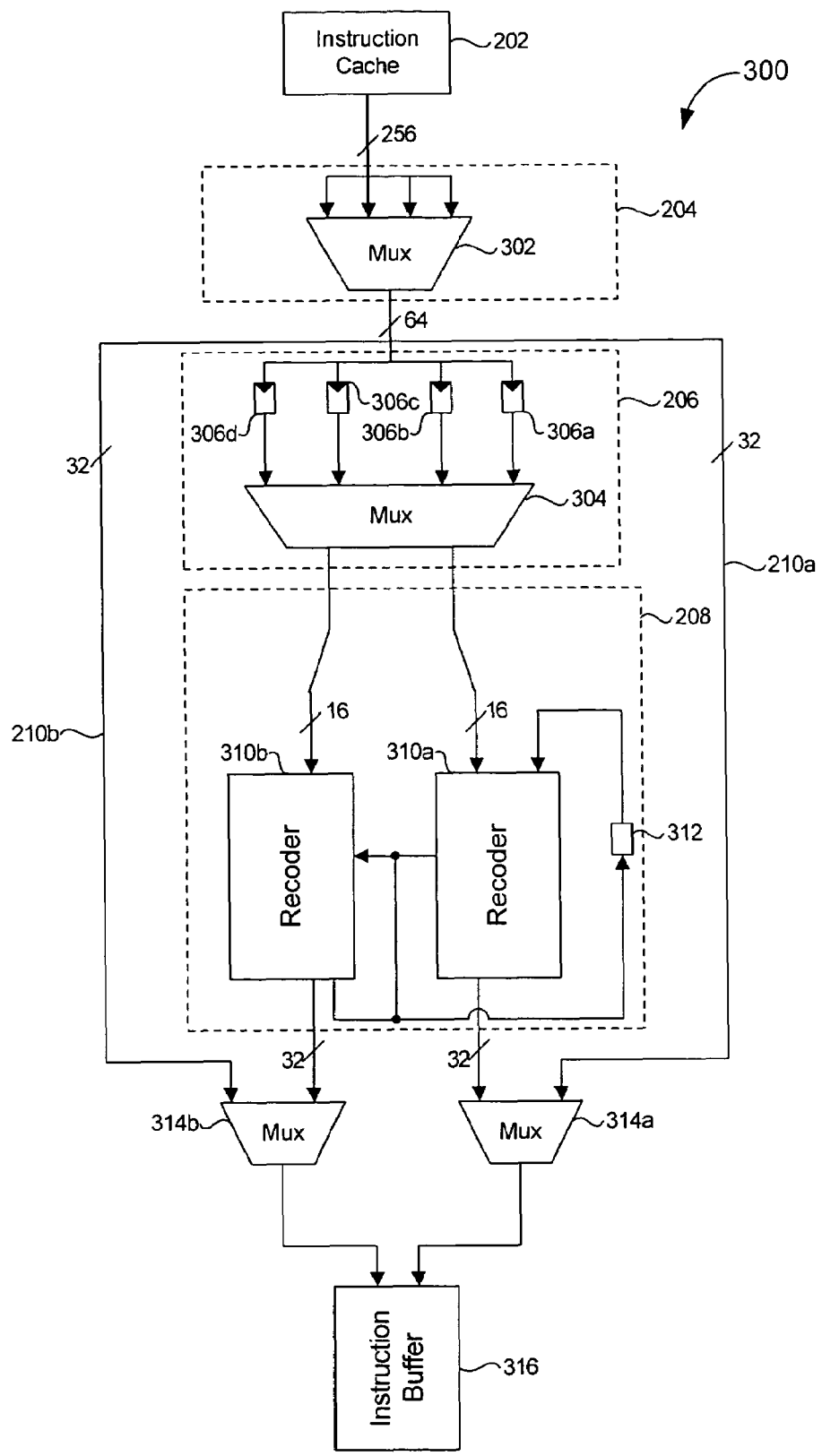
FIG. 3 is a schematic diagram of an example instruction fetch unit.
Figure 4A:
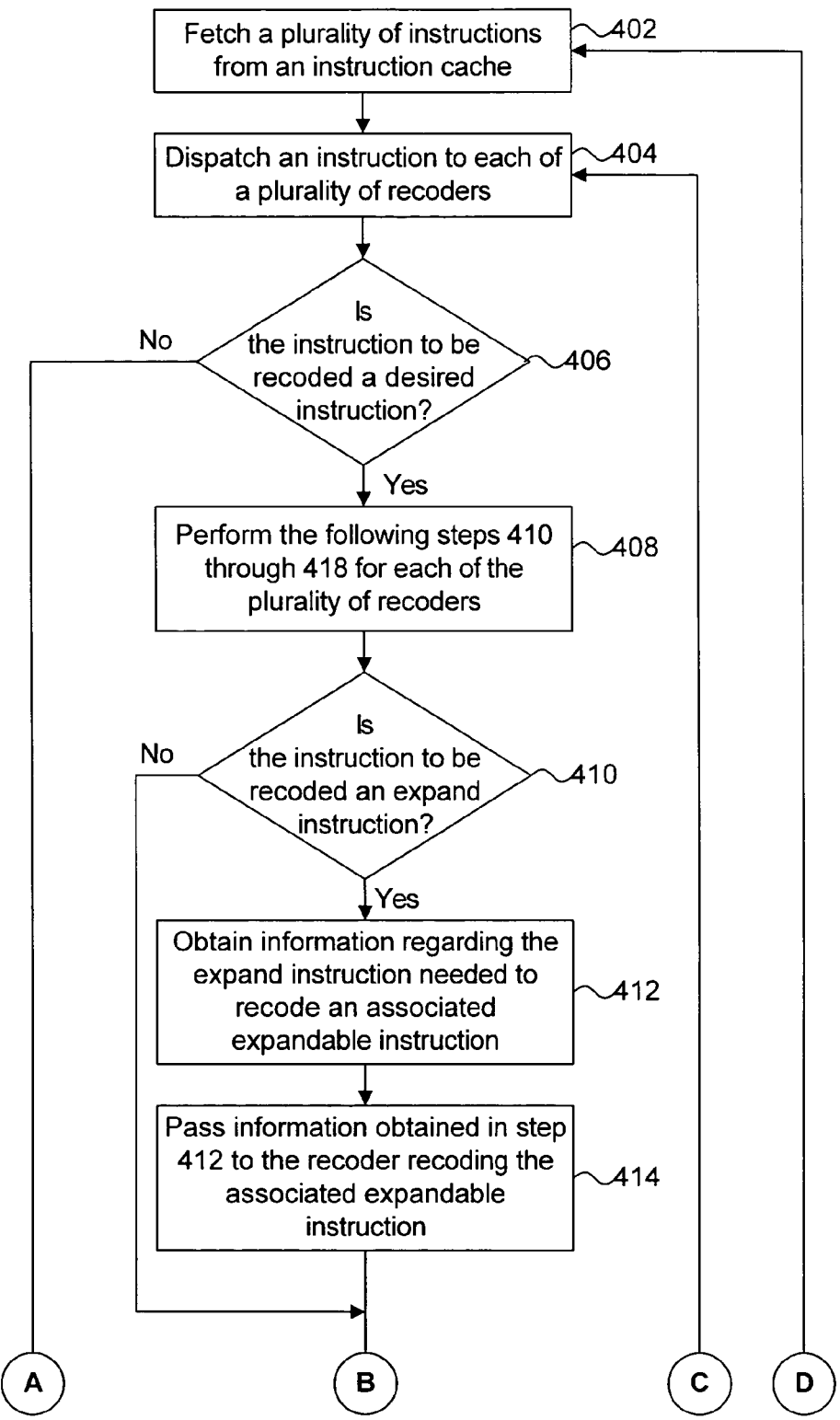
Figure 4B:
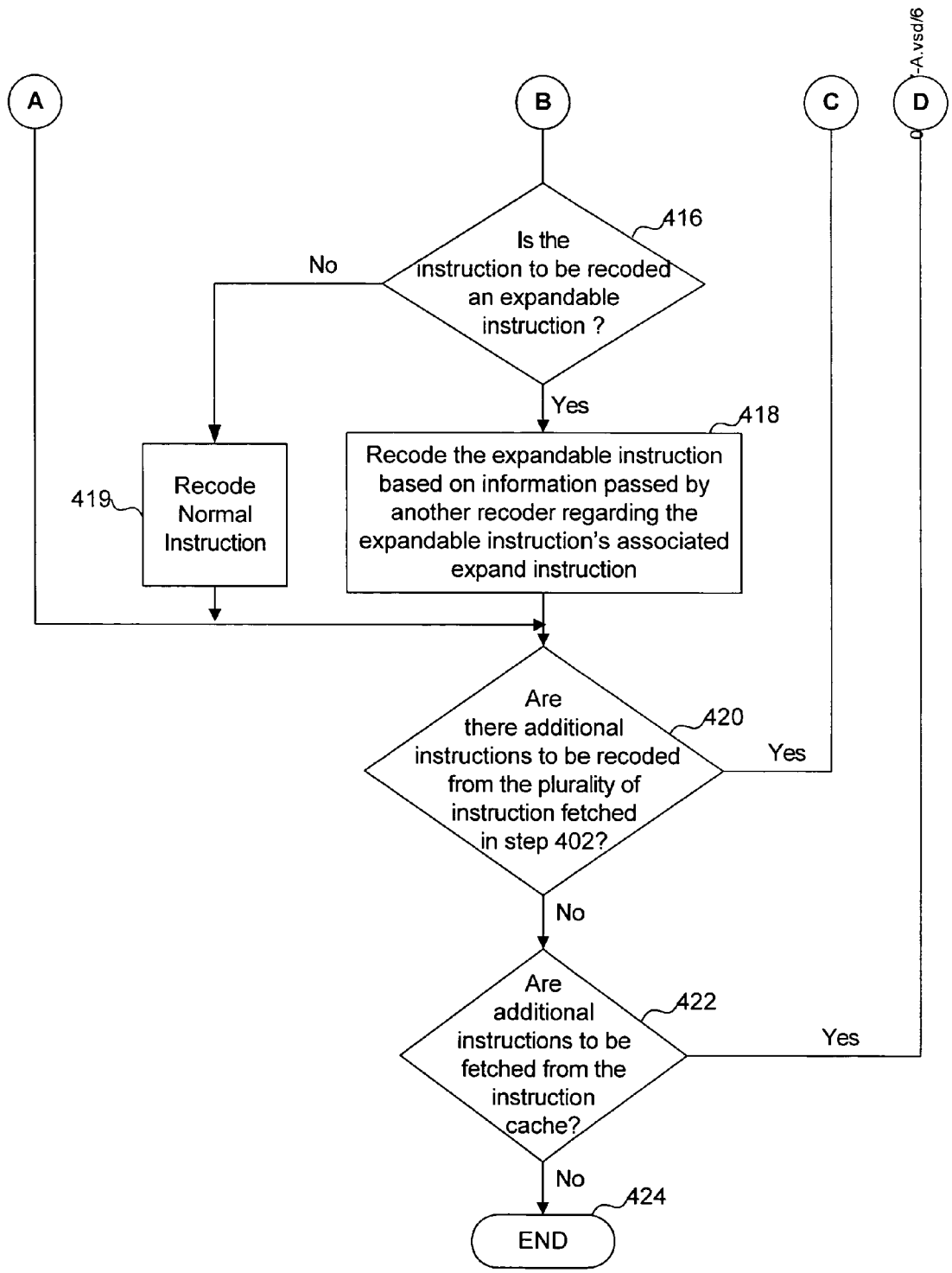

FIGS. 4A-B illustrate a flowchart of a method for performing the instruction fetch pipe stage operations of FIG. 1B, and which can be implemented by the instruction fetch unit of FIG. 3.

Figure 5A:
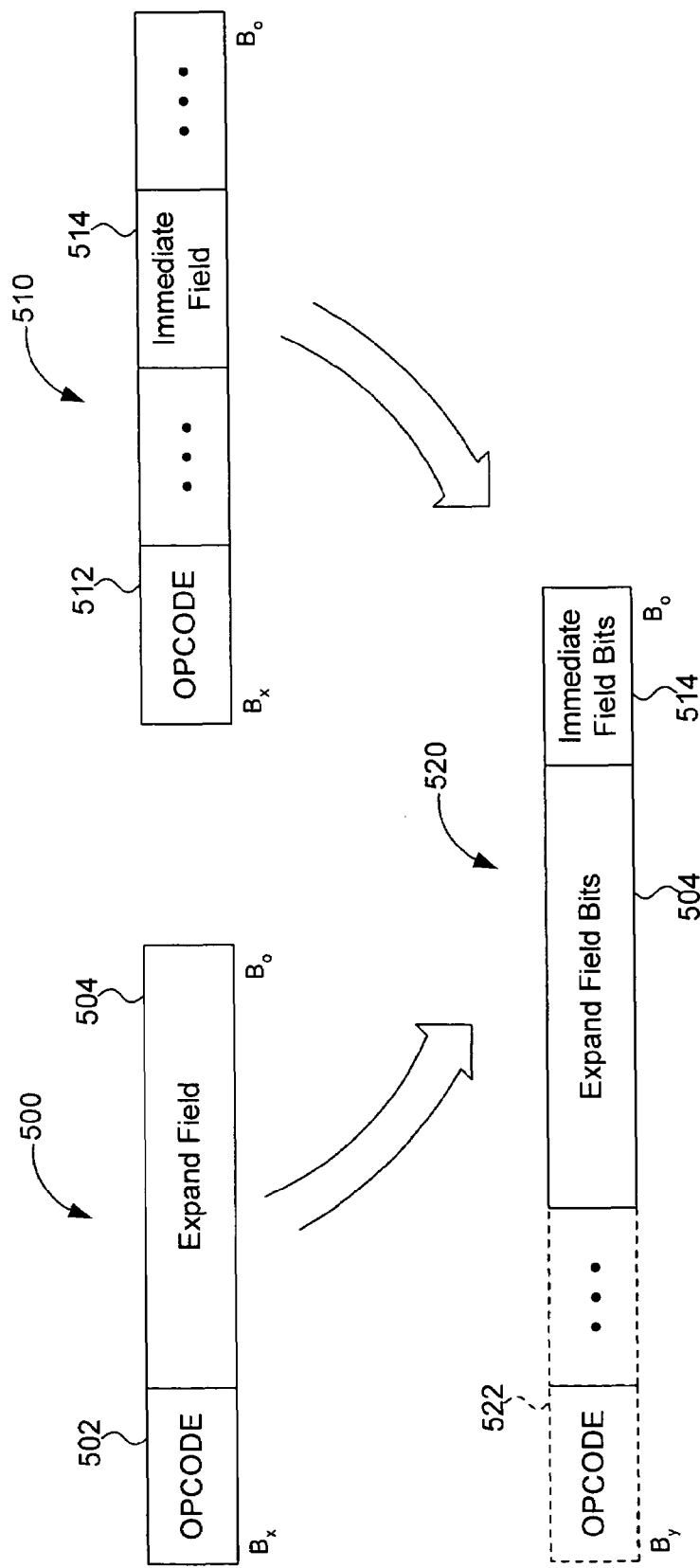
Figure 5B:
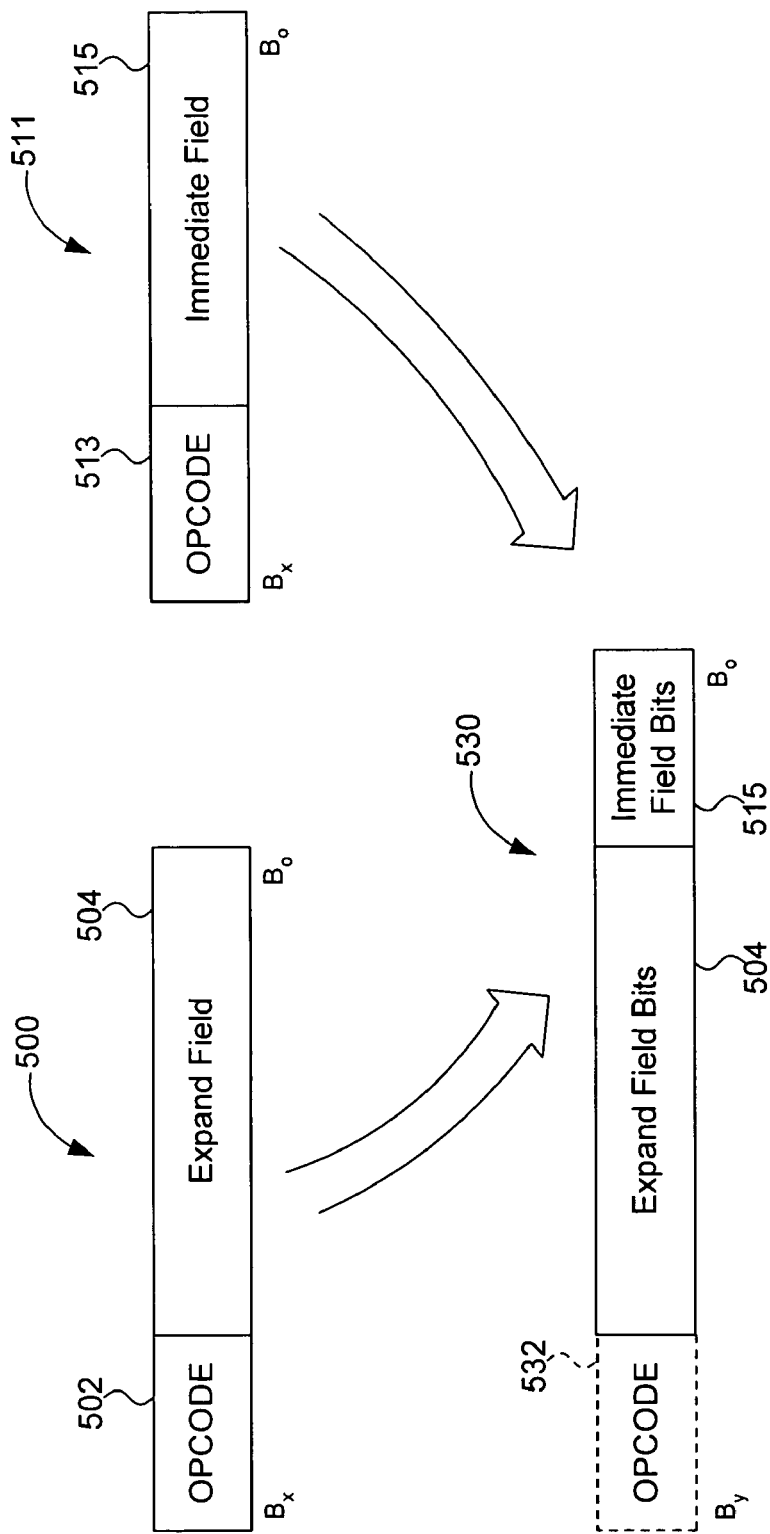

FIGS. 5A-B are diagrams that illustrate the recoding of an example expand instruction and an example expandable instruction.

FIGS. 6A-F are block diagrams that further illustrate the recoding of example instructions such as, for example, the expand and the expandable instructions of FIGS. 5A and 5B.

DETAILED DESCRIPTION OF THE INVENTION

FIG. 1A is a block diagram of an example computer system 100. Computer system 100 includes a pipelined processor 101, a memory 111, and a processor-memory bus 121. Processor 101 is coupled to processor-memory bus 121 via a cache controller 103 and a memory cache 107. Memory 111 is coupled to processor-memory bus 121 via a memory management unit (MMU) 113. A bus interface 133 couples an input/output (I/O) bus 131 to processor-memory bus 121. Three example input/output (I/O) controllers 135, 137, and 139 are shown coupled to I/O bus 131.

FIG. 1B is a block diagram illustrating a series of pipeline or pipe stage operations carried out by computer system 100. As illustrated in FIG. 1B, the pipe stage operations include instruction fetch operations 102, instruction decode and register fetch operations 104, execute and address calculation operations 106, memory access operations 108, and write back operations 110. The pipe stage operations identified in FIG. 1B are typical operations carried out, for example, by a reduced instruction set computer (RISC) architecture. In accordance with conventional RISC architecture, each pipe stage operation is allowed a single, uniform clock cycle to complete. Since the stages operate concurrently, the clock cycle is long enough to accommodate the slowest stage. Hence, once the pipeline of computer system 100 is full (i.e., each stage is processing one or more instructions), at least one instruction completes execution during each clock cycle. In addition to the stage operations of FIG. 1, alternate embodiments of system 100 may divide any single stage shown therein into multiple stages. For example, instruction fetch stage 102 may be divided into three stages that include instruction cache access in a first stage, tag comparison and way select in a second and instruction recoding in a third. Such alternate embodiments represent design choices that are well-known by those having ordinary skill in the art.

A detailed description of the conventional features of computer system 100 and its conventional pipe stage operations that would be known to persons skilled in the relevant computer arts is available, for example, in John L. Hennessy's and David A. Patterson's COMPUTER ARCHITECTURE: A QUANTITATIVE APPROACH, Third Edition (2003), available from Morgan Kaufman Publishers, San Francisco Calif., which is incorporated herein by reference in its entirety. Thus, these conventional features will not be further described herein. The description that follows focuses on novel and unconventional features of computer system 100 and its pipe stage operations that are not known to persons skilled in the relevant computer arts.

Figure 2:
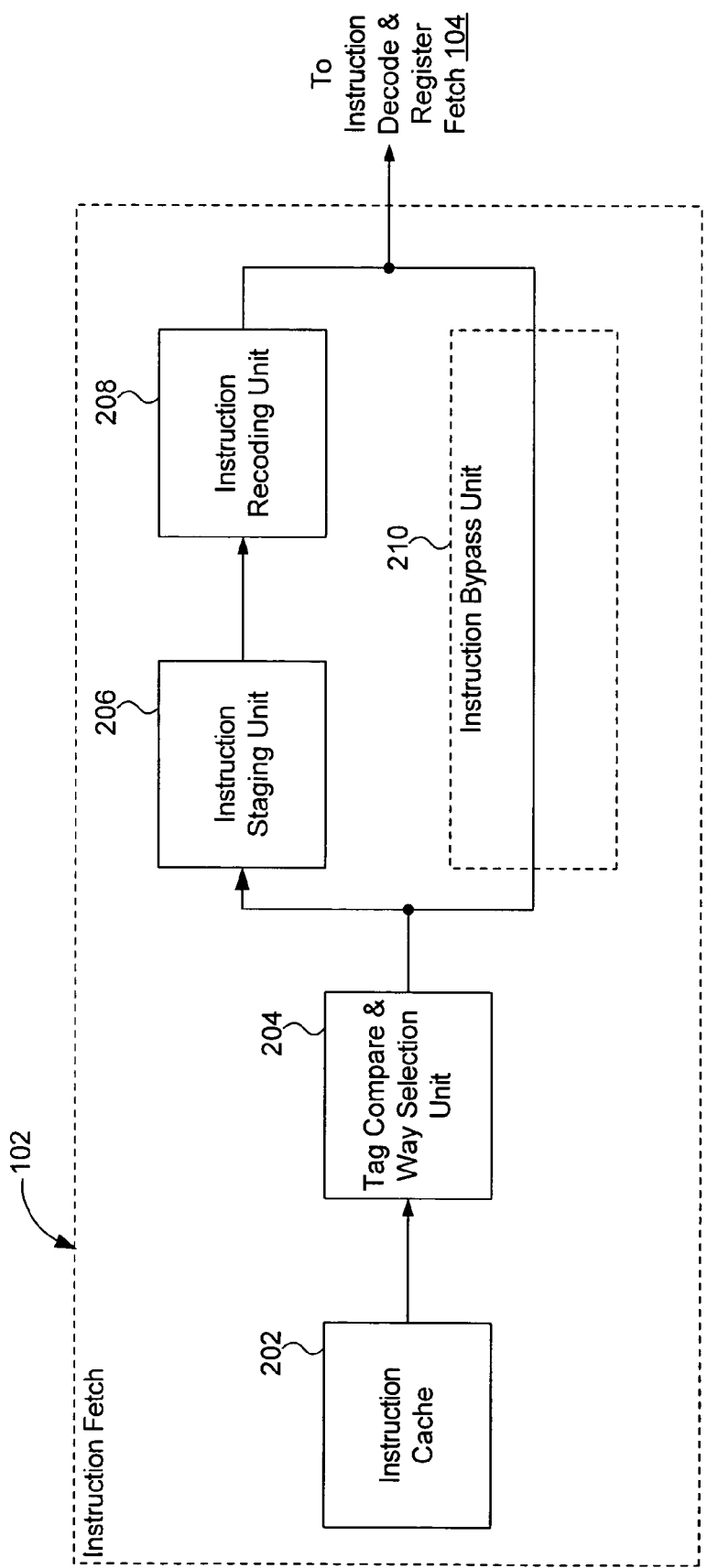
FIG. 2 is a block diagram illustrating an example implementation of the instruction fetch pipe stage operations of FIG. 1B.

FIG. 2 is a block diagram illustrating an example implementation of the instruction fetch pipe stage operations 102. As illustrated in FIG. 2, the instruction fetch pipe stage operations 102 can be implemented with an instruction cache 202, a tag compare and way selection unit 204, an instruction staging unit 206, an instruction recoding unit 208, and an instruction bypass unit 210. The instruction fetch pipe stage operations 102 shown in FIG. 2 are responsible for fetching instructions and providing them to the other pipe stages of computer system 100. The instruction fetch pipe stage operations 102 shown in FIG. 2 are also responsible for handling the results of all control transfer instructions such as, for example, branch instructions and jump instructions.

In an embodiment, the instruction fetch pipe stage of computer system 100 operates as follows. First, one or more instructions and cache tags are read from instruction cache 202. Instruction cache 202 is a part of memory cache 107 and is preferably an on-chip memory block with multi-way associativity. The number of instructions and cache tags that are read from instruction cache 202 is dependent upon available bandwidth. For example, in one embodiment, sixty-four instruction data bits and a cache tag are read from instruction cache 202 in one clock cycle of computer system 100. This equates to eight 8-bit instructions, four 16-bit instructions, two 32-bit instructions, or one 64-bit instruction. A large bandwidth permits additional instructions and cache tags to be read in one clock cycle of computer system 100.

After the instructions and cache tag(s) are read, tag compare and way selection unit 204 checks the tag(s) to verify, for example, that each read instruction is the correct (i.e., desired) instruction. Other tag checks that can be performed include, for example, a lock check and a parity check.

Instruction staging unit 206 stages and dispatches instructions to instruction recoding unit 208. In an embodiment, as noted above, multiple instructions can be read from instruction cache 202 during a single clock cycle of computer system 100. Thus, when this occurs, the multiple instructions must be staged and dispatched to instruction recoding unit 208 if the number of fetched instructions exceeds the parallel processing capabilities of instruction recoding unit 208.

Instruction recoding unit 208 recodes desired instructions received from instruction staging unit 206. The recoding operation of unit 208 maps instructions from one encoded state (e.g., a 16-bit instruction) to another encoded state (e.g., a 32-bit instruction). This is different from the decoding operation performed in pipestage operations 104 (Instruction Decode and Register Fetch) where an encoded instruction is decoded into one or more individual control signals for directing select operations within computer system 100. Instruction recoding unit 208 includes at least two interconnected parallel processing recoders for recoding instructions fetched from instruction cache 202. In an embodiment, instruction recoding unit 208 is capable of recoding instructions belonging to multiple instruction set architectures and instructions having different bit widths. How this is accomplished is further described below with regard to FIGS. 3-6. As illustrated in FIG. 3, the recoded instructions produced by instruction recoding unit 208 are stored in an instruction buffer 316. Instruction buffer 316 isolates the instruction fetch pipe stage operation of computer system 100 from the operations of the other pipe stages of computer system 100.

Instruction bypass unit 210 allows instructions to be passed directly from tag compare and way selection unit 204 to instruction buffer 316. In an embodiment, instruction bypass unit 210 is a data communications path. In other embodiments, instruction bypass unit 210 can include devices for partial or early decoding of instructions. Instruction bypass unit 210 is useful, for example, for allowing instructions that do not require recoding to be quickly placed in instruction buffer 316 or forwarded to the instruction decode pipe stage of computer system 100. In embodiments, processor 101 is equipped to decode and execute 32-bit instructions. In one embodiment, when a 32-bit instruction is fetched from instruction cache 202, it can be passed directly to instruction buffer 316 without recoding. On the other hand, a 16-bit instruction fetched from instruction buffer 202 would require recoding, and thus any 16-bit instruction fetched from instruction cache 202 would be dispatched through instruction recoding unit 208 and the recoded instruction produced from instruction recoding unit 208 would be placed in instruction buffer 316 for subsequent decoding and execution by processor 101. Other instances where instruction bypass unit 210 may be useful will become apparent to persons skilled in the relevant computer arts based on the description provided herein.

FIG. 3 is a schematic diagram of an example instruction fetch unit 300 that implements instruction fetch pipe stage operations 102. Instruction fetch unit 300 includes an instruction cache 202, multiplexers 302, 304, 314a, and 314b, instruction bypass paths 210a and 210b, data flip-flops 306a, 306b, 306c, and 306d, recoders 310a and 310b, an information storage buffer 312, and an instruction buffer 316.

Instruction cache 202 is coupled to multiplexer 302. In an embodiment, this coupling provides a bandwidth of 64 data bits plus an associated tag (i.e., each 64 bits of data is associated with one tag). This bandwidth allows, for example, four 16-bit instructions or two 32-bit instructions to be read from instruction cache 202 during each read cycle. In an embodiment, instructions and tags are read from instruction cache 202 every other clock cycle of computer system 100 unless instruction buffer 316 is full. If instruction buffer 316 is full, the fetching of additional instructions from instruction cache 202 can be temporarily halted until instruction buffer 316 is again able to accept data.

Multiplexer 302 is used to implement the features of tag compare and way selection unit 204 described herein. The output of multiplexer 302 is 64 data bits. These bits can be provided to instruction buffer 316 by way of instruction bypass paths 210a and 210b or provided to multiplexer 304, via data flip-flops 306a-d for instruction staging.

Multiplexer 304 and data flip-flops 306a-d are used to implement the instruction staging features described above with regard to instruction staging unit 206. Multiplexer 304 is coupled to at least two recoders 310. In an embodiment, the data associated with data flip-flops 306a and 306b are operated upon by multiplexer 304 and dispatched to recoders 310a and 310b, respectively during one clock cycle of computer system 100 (i.e., the data associated with data flip-flops 306a is dispatched to recoder 310a and the data associated with data flip-flops 306b is dispatched to recoder 310b). In the next clock cycle of computer system 100, the data associated with data flip-flops 306c and 306d are operated upon by multiplexer 304 and dispatched to recoders 310a and 310b, respectively (i.e., the data associated with data flip-flops 306c is dispatched to recoder 310a and the data associated with data flip-flops 306d is dispatched to recoder 310b). This processing permits proper staging of multiple instructions in embodiments where more instructions are fetched during an instruction cache read than can be processed in parallel by the available recoders 310. As noted above, in an embodiment such as the one depicted in FIG. 3, instruction cache 202 is read every other clock cycle of computer system 100 while recoding of the fetch instructions is being performed.

As shown in FIG. 3, recoders 310a and 310b are coupled to each other and to multiplexers 304, 314a, and 314b. Recoders 310a and 310b can be configured and operated so as to recode any given instruction or set of instructions to any particular desired instruction. For example, if it is desired that computer system 100 execute two different instruction set architectures, one having X-bit width instructions and one having Y-bit width instructions, Y being greater than X, then recoders 310a and 310b can be configured to recode X-bit width instructions, for example, to form Y-bit width recoded instructions or configured to recode both X-bit width instructions and Y-bit width instructions to form Z-bit width instructions. Recoders 310a and 310b can also be configured, for example, to recode instructions belonging to one instruction set to instructions of another instruction set, thereby facilitation program code portability, program code backwards compatibility and/or program code forwards compatibility. As will be appreciated by persons skilled in the relevant arts given the description herein, the possible configurations of recoders 310a and 310b and their ability to recode various instructions are potentially limitless.

The coupling of each recoder 310 to multiplexer 304 permits parallel recoding of instructions dispatched by multiplexer 304 to recoders 310a and 310b. Parallel recoding, in conjunction with the storing of recoded instructions in instruction buffer 316, decouples the instruction fetch pipe stage operations of computer system 100 from other pipe stage operations of computer system 100 and permits instruction fetch unit 300 to get ahead of, for example, instruction decoding and execution operations. By getting ahead, instruction fetch unit 300 shields the other pipe stage operations of computer system 100 from instruction fetch penalties such as cache misses and improves the overall operating performance of computer system 100.

The coupling as shown in FIG. 3, for example, of an output of recoder 310a to an input of recoder 310b and the coupling of an output of recoder 310b to an input of recoder 310a, via information storage buffer 312, permits recoders 310a and 310b to operate together to recode expand and expandable instructions (interrelated instructions that are illustrated in FIGS. 5A and 5B, and described in detail below). This joint recoding of expand and expandable instruction by recoders 310a and 310b avoids the insertion of instruction gaps or bubbles into instruction buffer 312 as a result of recoding delays that might otherwise be unavoidable when recoding these types of instructions.

Multiplexers 314a and 314b select which data bits are provided to instruction buffer 316. Each multiplexer 314a and 314b is coupled to an output of a recoder 310 and an instruction bypass path 210. In an embodiment, an operating mode of computer system 100, represented by one or more mode bits, is used to control multiplexers 314a and 314b thereby selecting when recoders 310 are bypassed.

Instruction buffer 316 is a conventional first-in first-out (FIFO) buffer. As noted above, buffer 316 helps to decouple the instruction fetch pipe stage operations of computer system 100 from other pipe stage operations of computer system 100 and permits instruction fetch unit 300 to get ahead of, for example, instruction decoding and execution operations. In an embodiment, when instruction buffer 316 is full, cache reads are temporarily halted.

As shown in the embodiment of FIG. 3, instruction recoding unit 208 includes two recoders; i.e., 310a and 310b. However, alternative embodiments of the present invention may include more than two recoders (operating in parallel, series or both). As would be apparent to one of ordinary skill in the art, the construction and operation of such alternative embodiments would be similar to and logical extensions of the two recoder embodiment described herein. Additionally, the embodiment of FIG. 3 shows a recoding operation that receives 16-bit instructions and produces 32-bit instructions. In alternate embodiments, the recoding operation may receive and produce instructions of different sizes than shown herein. Additionally, such operations may concurrently accommodate multiple-sized instructions. For example, 16-bit and 32-bit instructions may both be recoded to a different sized instruction altogether (e.g., 35 bits) to accommodate the unique characteristics of each instruction set.

FIGS. 4A and 4B illustrate a flowchart of a method 400 for performing instruction fetch pipe stage operations 102. Method 400 can be implemented, for example, by instruction fetch unit 300.

Method 400 starts at step 402. In step 402, a plurality of instructions are fetched (read) from an instruction cache. Preferably, the number of instructions fetched in step 402 will be equal to or greater than the number of recoders available to recode fetched instructions.

In step 404, instructions fetched in step 402 are dispatched to each recoder available for recoding an instruction.

In step 406, a determination is made as to whether an instruction to be recoded is a desired instruction. If the instruction to be recoded is a desired instruction, control passes to step 408. If the instruction to be recoded is not a desired instruction, control passes to step 420.

In step 408, it is noted that steps 410 through 418 of method 400 are performed for each recoder available to recode an instruction fetched form an instruction cache in step 402.

In step 410, a determination is made by each available recoder as to whether the instruction to be recoded is an expand instruction. This determination can be made, for example, by examining the instruction's opcode. If the instruction to be recoded is an expand instruction, control passes to step 412. If the instruction to be recoded is not an expand instruction, control passes to step 416.

An example of an expand instruction is provided in FIGS. 5A and 5B. As used herein, an expand instruction is an instruction having data bits that are added or concatenated to bits of a second expandable instruction, thereby expanding an immediate value held in an immediate field of the expandable instruction. An example of an expandable instruction is also provided in FIG. 5A or FIG. 5B. Each expand instruction has an associated expandable instruction with which it must be paired during recoding or else the expanded immediate value formed during recoding, by combining data bits of the expand instruction and bits of an immediate field of the expandable instruction will result in an incorrectly recoded instruction. Persons skilled in the relevant computer arts will recognize expand and expandable instructions, as used herein, as being similar to MIPS16e™ instructions having similar functionality (e.g., the so-called "EXTEND" instruction). Additional information regarding the MIPS16e™ architecture may be found in the following publication, which is available from MIPS Technologies, Inc., and hereby incorporated by reference in its entirety: MIPS32™ Architecture for Programmers Volume IV-a: The MIPS16e™ Application-Specific Extension to the MIPS32™ Architecture, Rev. 2.00, MIPS Technologies, Inc. (2003). The expand and expandable instructions described herein, however, are not limited to just the functionality available with MIPS16e™ instructions.

In step 412, information is obtained by a recoder regarding an expand instruction, which is needed to recode the expand instruction's associated expandable instruction. At a minimum, this information will include one or more data bits of the expand instruction that are to be added or concatenated to one or more data bits of the associated expandable instruction during recoding. The actual minimum amount of information needed to recode a given pair of expand and expandable instructions according to the present invention will be dependent upon the configuration of the recoders used to recode these instructions.

In step 414, the information obtained in step 412 is passed to the recoder that needs the information to recode the associated expandable instruction. In an embodiment, this information is passed with other information such as the fact that an expand instruction has been detected.

In step 416, a determination is made as to whether the instruction to be recoded is an expandable instruction. In an embodiment, this determination can be made, for example, by examining the instruction's opcode and/or information passed by another recoder. If the instruction to be recoded is an expandable instruction, control passes to step 418. If the instruction to be recoded is not an expandable instruction, control passes to step 419.

In step 418, an expandable instruction is recoded based on information passed by another recoder (e.g, in step 414). As noted herein, the recoding process used is dependent on the configuration and operation of the particular recoder used to recode the expandable instruction. FIGS. 5A and 5B illustrate the recoding process for expand and expandable instructions.

In step 419, a normal (e.g., a non-expand or non-expandable) instruction is recoded without any need for information passed by another recoder. Again, as noted herein, the recoding process used in step 419 is dependent on the configuration and operation of the particular recoder used to recode the normal instruction.

In step 420, a determination is made whether there are additional instructions, fetched in step 402, that need to be recoded. If there are additional instructions that need to be recoded, control passes to step 404. If there are no additional instructions, fetched in step 402, that need to be recoded, control passes to step 422.

In step 422, a determination is made whether there are additional instructions to be fetched from the instruction cache. If there are additional instructions to be fetched, control passes to step 402. Otherwise, control passes to step 424.

In step 424, method 400 ends.

FIG. 5A is a diagram that illustrates the process of recoding of an example expand instruction 500 and an example expandable instruction 510 to form a recoded instruction 520.

Expand instruction 500 includes an opcode field 502 and an expand field 504. As shown in FIG. 5A, instruction 500 has a width of X-bits ($B_x$).

Expandable instruction 510 includes an opcode field 512 and an immediate field 514. Fields 512 and 514 are not the only fields of expandable instruction 510. Expandable instruction 510 can be any instruction having an immediate field such as, for example, a jump instruction, a branch instruction, a memory read instruction, a memory write instruction, et cetera. As shown in FIG. 5A, instruction 510 also has a width of X-bits ($B_x$).

Recode instruction 520 is formed by adding or concatenating the bits of expand field 504 and immediate field 514 to form an expanded immediate field in instruction 520. The opcode field 522 of recoded instruction 520 directs computer system 100 to perform the operation or operations indicated by opcode field 512 of instruction 510. As shown in FIG. 5A, in an embodiment, recoded instruction 520 has a width of Y-bits ($B_y$).

FIG. 5B is a diagram that illustrates the process of recoding a second example expandable instruction 511 to form a recoded instruction 530.

Expandable instruction 511 includes an opcode field 513 and an immediate field 515. In this case, fields 513 and 515 are the only fields of expandable instruction 511. Expandable instruction 511 is representative of instructions having functionality similar to MIPS16e™ jump and link (JAL) instructions or jump and link and switch operating modes (JALX) instructions.

Recode instruction 530 is formed by adding or concatenating the bits of expand field 504 and immediate field 515 to form an expanded immediate field in instruction 530. The opcode field 532 of recoded instruction 530 directs computer system 100 to perform the operation or operations indicated by opcode field 513 of instruction 511. As shown in FIG. 5B, in an embodiment, recoded instruction 530 also has a width of Y-bits ($B_y$).

FIGS. 6A-F are block diagrams that further illustrate the operation of a two-recoder embodiment of computer system 100, i.e., the embodiment illustrated by instruction fetch unit 300, and the recoding of instructions such as, for example, the expand and the expandable instructions of FIGS. 5A and 5B.

Figure 6A:
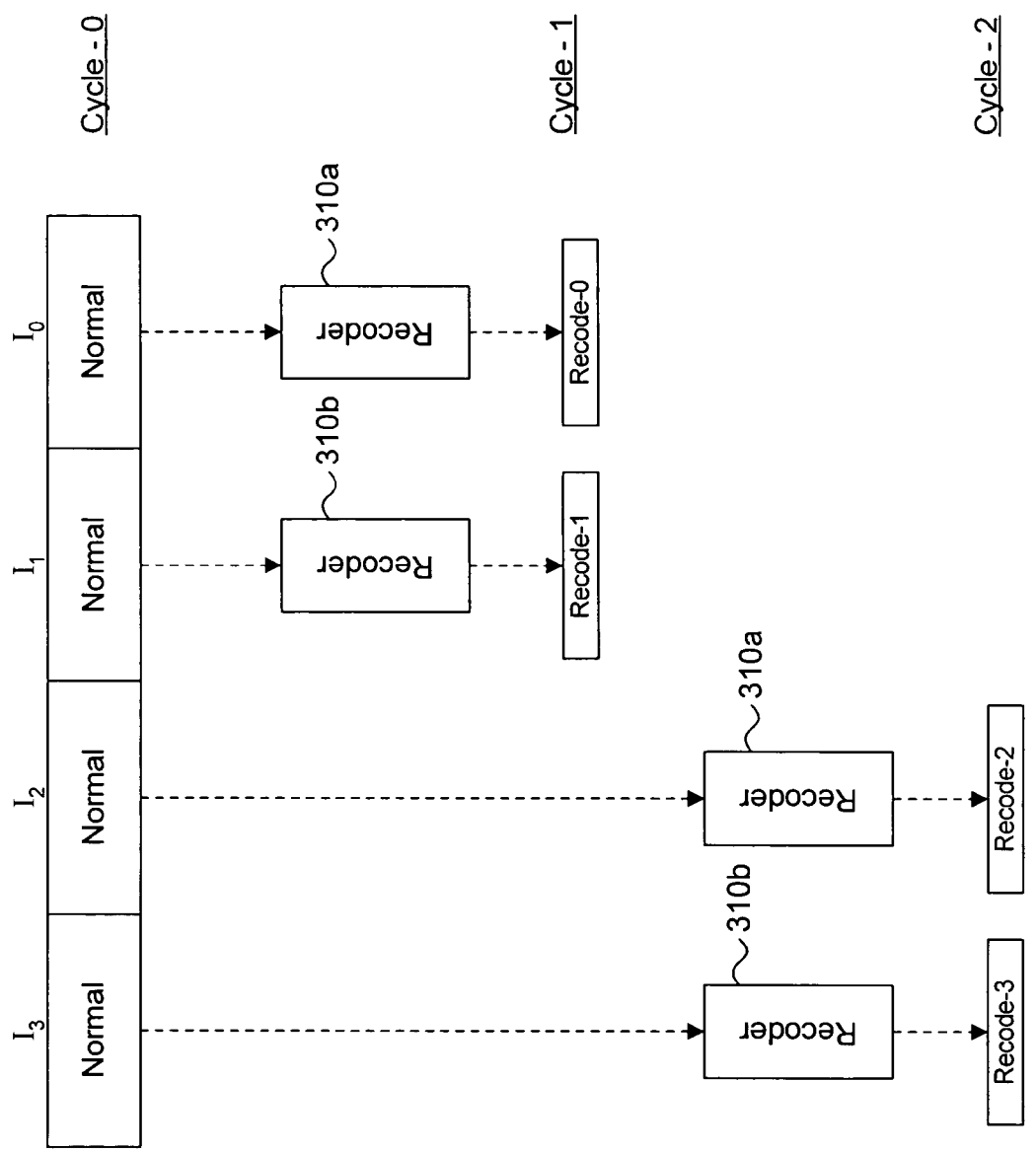

FIG. 6A illustrates an example recoding operation wherein four normal (e.g., non-expand and non-expandable) instructions $I_0$, $I_1$, $I_2$, and $I_3$ are fetched from an instruction cache during a clock cycle-0 of computer system 100. Instruction $I_0$ is dispatched to a recoder 310a. Instruction $I_1$ is dispatched to a recoder 310b. Because both of the instructions are normal instruction, recoders 310a and 310b are able to operate independently and recode both instructions $I_0$ and $I_1$ during one clock cycle of computer system 100. In the next clock cycle of computer system 100, instruction $I_2$ is dispatched to recoder 310a and instruction $I_3$ is dispatched to recoder 310b. Again, because both of these instructions are normal instructions, recoders 310a and 310b are able to operate independently and recode instruction $I_2$ and $I_3$ during a single clock cycle of computer system 100. Thus, at the end of two clock cycles of computer system 100, all four instructions $I_0$, $I_1$, $I_2$, and $I_3$ have been recoded by the two recoders 310a and 310b.

Figure 6B:
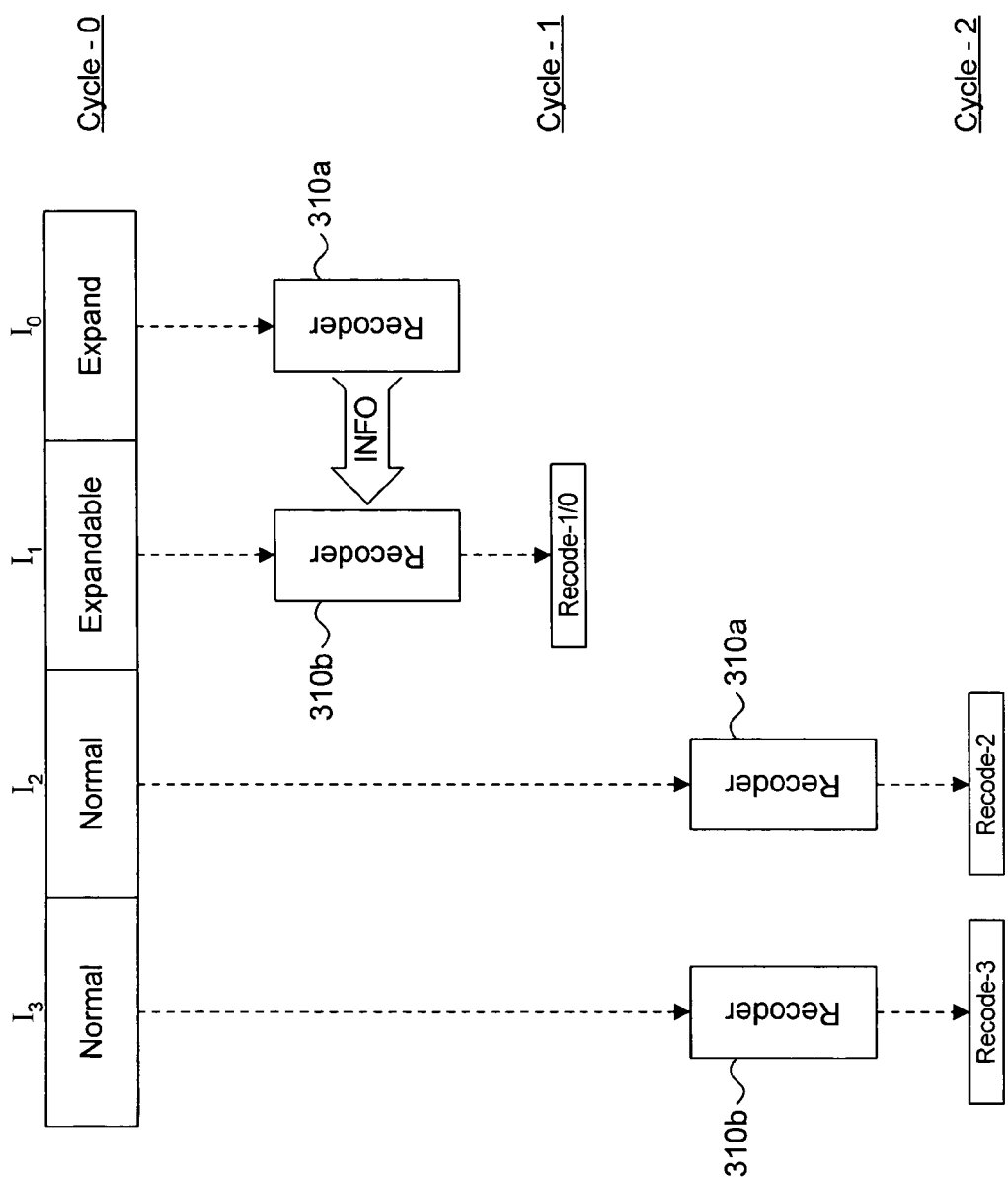

FIG. 6B illustrates an example recoding operation wherein one expand instruction $I_0$, one expandable instruction $I_1$, and two normal (e.g., non-expand and non-expandable) instructions $I_2$ and $I_3$ are fetched from an instruction cache during a clock cycle-0 of computer system 100. Instruction $I_0$ is dispatched to a recoder 310a. Instruction $I_1$ is dispatched to a recoder 310b. Because instruction $I_0$ is an expand instruction, recoder 310a obtains information needed to recode expandable instruction $I_1$ and passes this information to recoder 310b. Recoder 310b then uses the passed information from recoder 310a to recode the expandable instruction $I_1$. As shown in FIG. 6B, recoders 310a and 310b operate together to recode instructions $I_0$ and $I_1$ and form a single recoded instruction during one clock cycle of computer system 100. In the next clock cycle of computer system 100, instruction $I_2$ is dispatched to recoder 310a and instruction $I_3$ is dispatched to recoder 310b. This time, because both of these instructions are normal instructions, recoders 310a and 310b are able to operate independently and recode instructions $I_2$ and $I_3$ during a single clock cycle of computer system 100. At the end of two clock cycles of computer system 100, all four instructions $I_0$, $I_1$, $I_2$, and $I_3$ have been recoded by the two recoders 310a and 310b to form three recoded instructions.

Figure 6C:
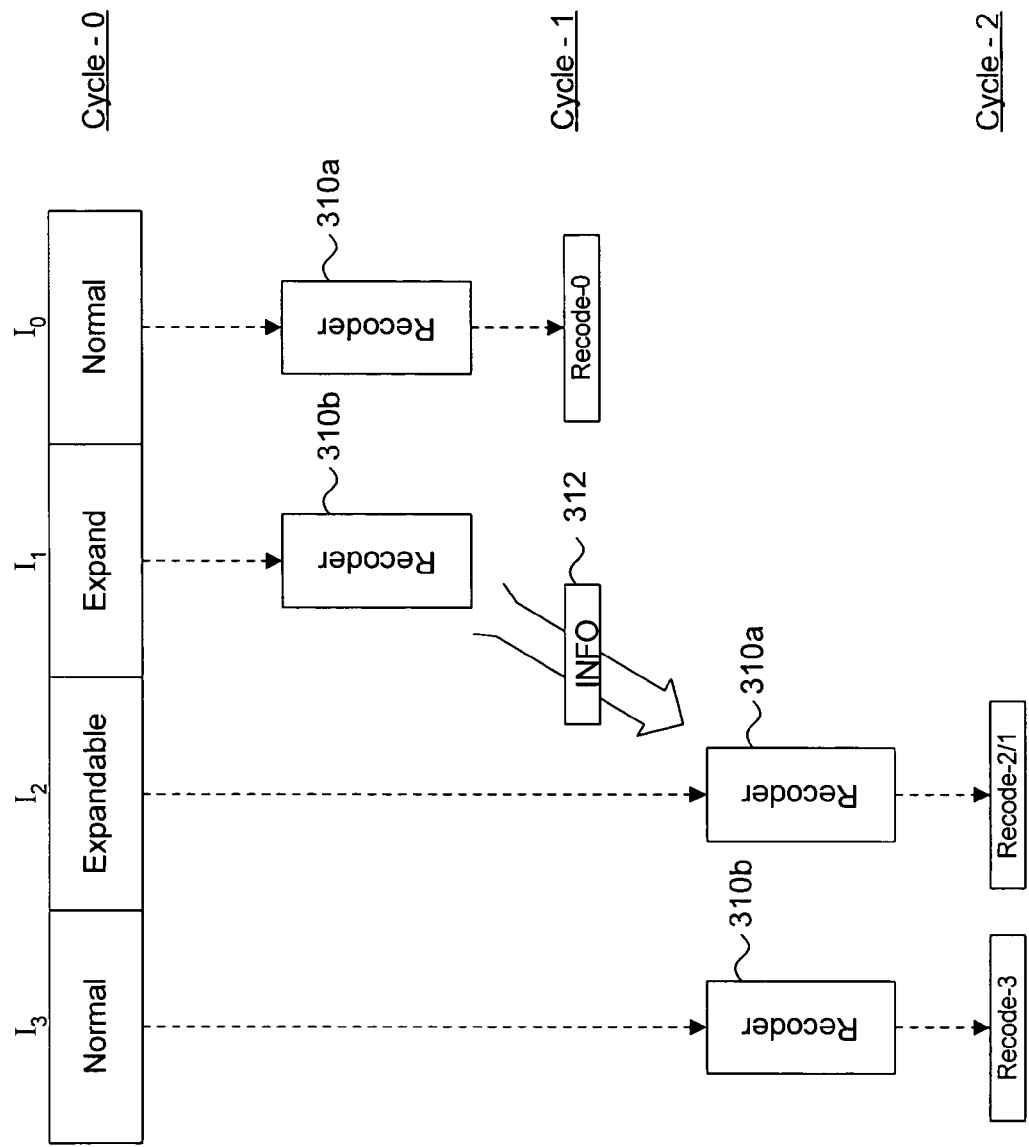

FIG. 6C illustrates an example recoding operation wherein one expand instruction $I_1$, one expandable instruction $I_2$, and two normal (e.g., non-expand and non-expandable) instructions $I_0$ and $I_3$ are fetched from an instruction cache during a clock cycle-0 of computer system 100. Instruction $I_0$ is dispatched to a recoder 310a. Instruction $I_1$ is dispatched to a recoder 310b. Because instruction $I_0$ is a normal instruction, recoder 310a is able to recode the instruction without any input from another recoder. Because instruction $I_1$ is an expand instruction, recoder 310b obtains information needed to recode expandable instruction $I_2$ and passes this information to recoder 310b via information storage buffer 312. Buffer 312 stores the information needed to recode instruction $I_2$ until instruction $I_2$ can be dispatched to recoder 310a. Recoder 310a then uses the passed information from recoder 310b to recode the expandable instruction $I_2$ during a subsequent clock cycle (clock cycle 2) of computer system 100. Because instruction $I_3$ is a normal instruction, recoder 310b is able to recode the instruction without any input from another recoder. Again, at the end of two clock cycles of computer system 100, all four instructions $I_0$, $I_1$, $I_2$, and $I_3$ have been recoded by the two recoders 310a and 310b to form three recoded instructions.

Figure 6D:
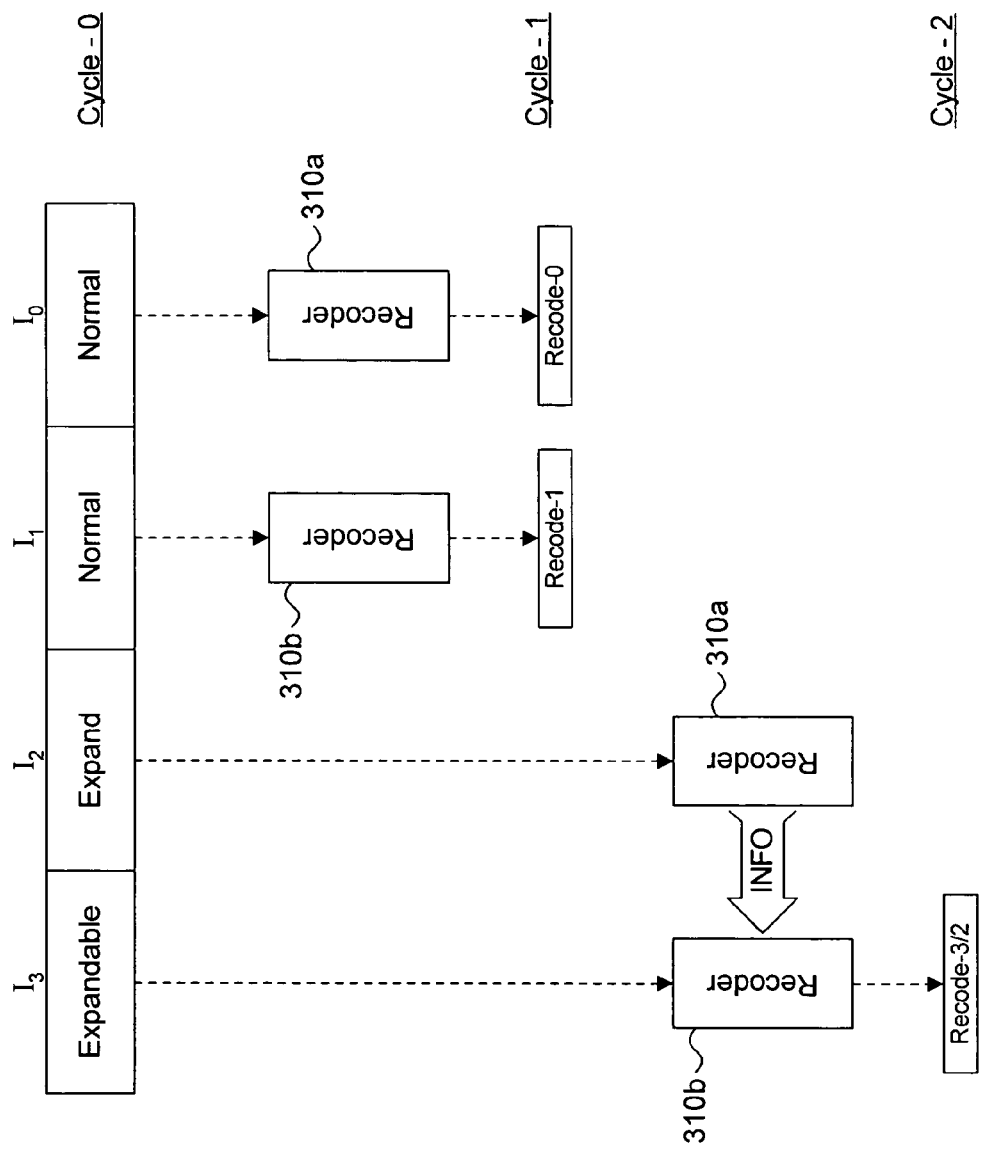

FIG. 6D illustrates an example recoding operation wherein one expand instruction $I_2$, one expandable instruction $I_3$, and two normal (e.g., non-expand and non-expandable) instructions $I_0$ and $I_1$ are fetched from an instruction cache during a clock cycle-0 of computer system 100. Instruction $I_0$ is dispatched to a recoder 310a. Instruction $I_1$ is dispatched to a recoder 310b. Because both of these instructions are normal instructions, recoders 310a and 310b are able to operate independently and recode instructions $I_0$ and $I_1$ during a single clock cycle of computer system 100. Because instruction $I_2$ is an expand instruction, recoder 310a obtains information needed to recode expandable instruction $I_3$ and passes this information to recoder 310b. Recoder 310b then uses the passed information from recoder 310a to recode the expandable instruction $I_3$. As shown in FIG. 6B, recoders 310a and 310b operate together to recode instructions $I_2$ and $I_3$ and form a single recoded instruction during one clock cycle of computer system 100. At the end of two clock cycles of computer system 100, all four instructions $I_0$, $I_1$, $I_2$, and $I_3$ have been recoded by the two recoders 310a and 310b to form three recoded instructions.

Figure 6E:
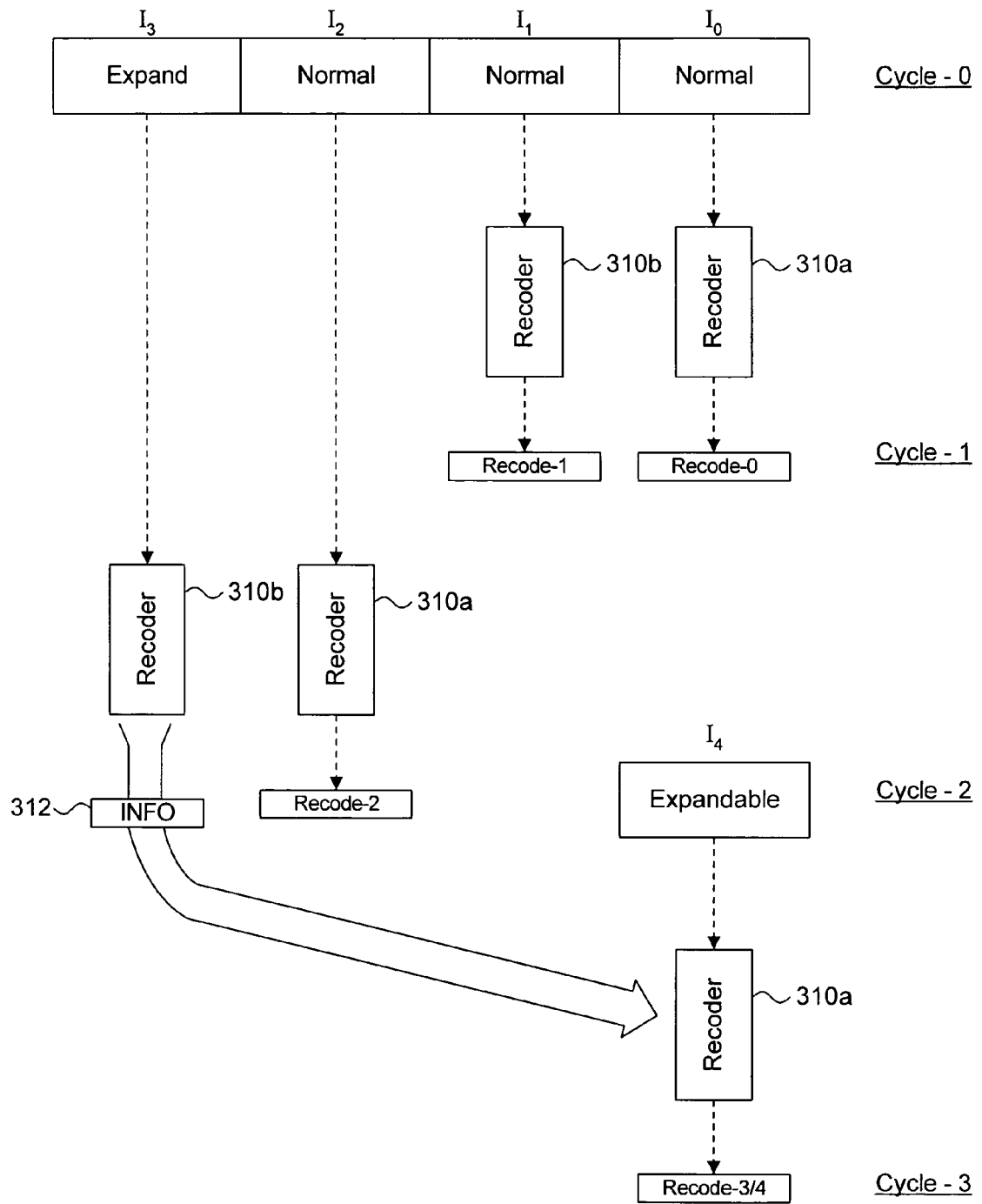

FIG. 6E illustrates an example recoding operation wherein one expand instruction $I_3$ and three normal (e.g., non-expand and non-expandable) instructions $I_0$, $I_1$ and $I_2$ are fetched from an instruction cache during a clock cycle-0 of computer system 100. Instruction $I_0$ is dispatched to a recoder 310a. Instruction $I_1$ is dispatched to a recoder 310b. Because both of these instructions are normal instructions, recoders 310a and 310b are able to operate independently and recode instructions $I_0$ and $I_1$ during a single clock cycle of computer system 100. Instruction $I_2$ is also dispatched to recoder 310a. Because instruction $I_2$ is a normal instruction, recoder 310a is able to recode the instruction without any input from another recoder. Instruction $I_3$ is dispatched to recoder 310b. Because instruction $I_3$ is an expand instruction, recoder 310b obtains information needed to recode expandable instruction $I_4$ and passes this information to recoder 310a via information storage buffer 312. Recoder 310a then uses the passed information from recoder 310b to recode the expandable instruction $I_4$.

Figure 6F:
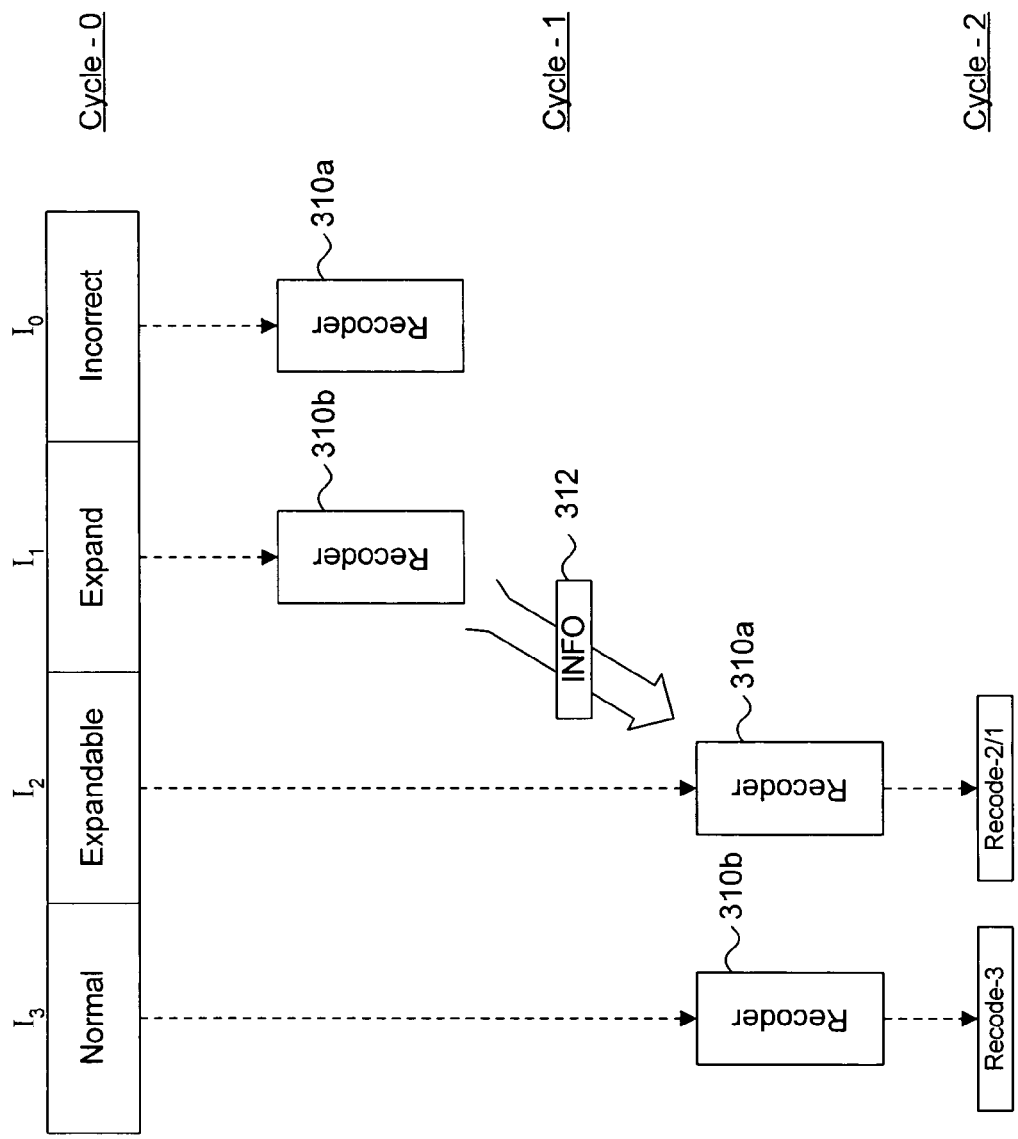

FIG. 6F illustrates an example recoding operation wherein one incorrect (i.e., undesired) instruction $I_0$, one expand instruction $I_1$, one expandable instruction $I_2$, and one normal instruction $I_3$ are fetched from an instruction cache during a clock cycle-0 of computer system 100. Instruction $I_0$ is not recoded because it is an incorrect instruction. Instruction $I_1$ is dispatched to a recoder 310b. Because instruction $I_1$ is an expand instruction, recoder 310b obtains information needed to recode expandable instruction $I_2$ and passes this information to recoder 310a via information storage buffer 312. Recoder 310a then uses the passed information from recoder 310b to recode the expandable instruction $I_2$. Because instruction $I_3$ is a normal instruction, recoder 310b is able to operate independently and recode instruction $I_3$ without any input from another recoder. As shown in FIG. 6F, at the end of two clock cycles of computer system 100, the three instructions $I_1$, $I_2$, and $I_3$ have been recoded by the two recoders 310a and 310b to form two recoded instructions.

As already noted, alternate embodiments of the invention may have more than two recoders. These embodiments would operate similarly to the two recoder embodiment described above. How such embodiments are implemented would be apparent to persons skilled in the relevant computer arts given the description of the invention herein.

CONCLUSIONS

While various embodiments of the present invention have been described above, it should be understood that they have been presented by way of example, and not limitation. It will be apparent to persons skilled in the relevant computer arts that various changes in form and detail can be made therein without departing from the spirit and scope of the invention.

For example, in addition to recoding system implementations using hardware (e.g., within or coupled to a Central Processing Unit ("CPU"), microprocessor, microcontroller, digital signal processor, processor core, System on Chip ("SOC"), or any other programmable device), implementations may also be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and methods described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and methods described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

What is claimed is:

1. An instruction fetch unit for a processor, comprising:
 a first recoder to map an instruction from one instruction format to another instruction format; and
 a second recoder to map an instruction from one instruction format to another instruction format, the second recoder coupled to the first recoder,
 wherein the first recoder passes information regarding a first instruction belonging to a first instruction set architecture to the second recoder, and the second recoder recodes a second instruction belonging to the first instruction set architecture using the passed information to form a recoded instruction belonging to a second instruction set architecture.

2. The instruction fetch unit of claim 1, further comprising:
 an instruction-staging unit coupled to the first recoder and the second recoder that dispatches an instruction from an instruction cache to one of the first recoder and the second recoder.

3. The instruction fetch unit of claim 1, wherein the processor executes instructions having X-bits and belonging to the first instruction set architecture and instructions having Y-bits and belonging to the second instruction set architecture, Y being greater than X, and wherein the first recoder and the second recoder recode an instruction belonging to one of the first instruction set architecture and the second instruction set architecture to form a recoded instruction having at least Y-bits.

4. The instruction fetch unit of claim 3, wherein each instruction of the first instruction set architecture has 16-bits and each instruction of the second instruction set architecture has 32-bits.

5. The instruction fetch unit of claim 3, wherein the first instruction set architecture includes an expand instruction used to enlarge an immediate field of an expandable instruction of the first instruction set architecture, and wherein the first recoder passes at least one bit of the expand instruction to the second recoder thereby allowing the second recoder to recode the expandable instruction.

6. The instruction fetch unit of claim 5, wherein the at least one bit of the expand instruction is concatenated to at least one bit of the expandable instruction.

7. The instruction fetch unit of claim 3, wherein the first instruction set architecture includes a mode-switching instruction that switches the operating mode of the processor, and wherein the first recoder passes one or more bits to the second recoder thereby allowing the second recoder to recode the mode-switching instruction.

8. The instruction fetch unit of claim 7, wherein the one or more bits are concatenated to at least one bit of the mode-switching instruction.

9. The instruction fetch unit of claim 1, wherein the first instruction is used to enlarge a field of the second instruction and the information is at least one bit of the first instruction.

10. The instruction fetch unit of claim 9, wherein the first instruction is an expand instruction, the second instruction is an expandable instruction and the field is an immediate field.

11. A processor, comprising:
 a first recoder to map an instruction from one instruction format to another instruction format; and
 a second recoder to map an instruction from one instruction format to another instruction format, the second recoder coupled to the first recoder,
 wherein the first recoder passes information regarding a first instruction belonging to a first instruction set architecture to the second recoder, and the second recoder recodes a second instruction belonging to the first instruction set architecture using the passed information to form a recoded instruction belonging to a second instruction set architecture.

12. The processor of claim 11, further comprising:
 an instruction-staging unit coupled to the first recoder and the second recoder that dispatches an instruction from an instruction cache to one of the first recoder and the second recoder.

13. The processor of claim 12, wherein the processor executes instructions having X-bits and belonging to the first instruction set architecture and instructions having Y-bits and belonging to the second instruction set architecture, Y being greater than X, and wherein the first recoder and the second recoder recode an instruction belonging to one of the first instruction set architecture and the second instruction set architecture to form a recoded instruction having at least Y-bits.

14. The processor of claim 13, wherein each instruction of the first instruction set architecture has 16-bits and each instruction of the second instruction set architecture has 32-bits.

15. The processor of claim 13, wherein the first instruction set architecture includes an expand instruction used to enlarge an immediate field of an expandable instruction of the first instruction set architecture, and wherein the first recoder passes at least one bit of the expand instruction to the second recoder thereby allowing the second recoder to recode the expandable instruction.

16. The processor of claim 15, wherein the at least one bit of the expand instruction is concatenated to at least one bit of the expandable instruction.

17. The processor of claim 13, wherein the first instruction set architecture includes a mode-switching instruction that switches the operating mode of the processor, and wherein the first recoder passes one or more bits to the second recoder thereby allowing the second recoder to recode the mode-switching instruction.

18. The processor of claim 17, wherein the one or more bits are concatenated to at least one bit of the mode-switching instruction.

19. The processor of claim 11, wherein the first instruction is used to enlarge a field of the second instruction and the information is at least one bit of the first instruction.

20. The processor of claim 19, wherein the first instruction is an expand instruction, the second instruction is an expandable instruction, and the field is an immediate field.

21. A processing system, comprising:
a first recoder to map an instruction from one instruction format to another instruction format that generates at least one information bit based on an expand instruction belonging to a first instruction set architecture; and
a second recoder that recodes an expandable instruction belonging to the first instruction set architecture using the at least one information bit generated to form a recoded instruction belonging to a second instruction set architecture.

22. The processing system of claim 21, further comprising:
an instruction-staging unit coupled to the first recoder and the second recoder that dispatches an instruction from an instruction cache to one of the first recoder and the second recoder.

23. The processing system of claim 21, wherein the processing system executes instructions having X-bits and belonging to the first instruction set architecture and instructions having Y-bits and belonging to the second instruction set architecture, Y being greater than X, and wherein the first recoder and the second recoder recode an instruction belonging to one of the first instruction set architecture and the second instruction set architecture to form a recoded instruction having at least Y-bits.

24. The processing system of claim 23, wherein each instruction of the first instruction set architecture has 16-bits and each instruction of the second instruction set architecture has 32-bits.

25. The processing system of claim 23, wherein the expand instruction is used to enlarge an immediate field of the expandable instruction, and wherein the first recoder passes expand field bits to the second recoder.

26. The processing system of claim 25, wherein the expand field bits are concatenated to at least one bit of the expandable instruction.

27. A computer readable storage medium comprising a microprocessor core embodied in software, the microprocessor core comprising:
a first recoder to map an instruction from one instruction format to another instruction format; and
a second recoder to map an instruction from one instruction format to another instruction format, the second recoder coupled to the first recoder,
wherein the first recoder passes information regarding a first instruction belonging to a first instruction set architecture to the second recoder, and the second recoder recodes a second instruction belonging to the first instruction set architecture using the passed information to form a recoded instruction belonging to a second instruction set architecture.

28. The computer readable storage medium of claim 27, further comprising:
an instruction-staging unit coupled to the first recoder and the second recoder that dispatches an instruction from an instruction cache to one of the first recoder and the second recoder.

29. The computer readable storage medium of claim 27, wherein the microprocessor core executes instructions having X-bits and belonging to the first instruction set architecture and instructions having Y-bits and belonging to the second instruction set architecture, Y being greater than X, and wherein the first recoder and the second recoder recode an instruction belonging to one of the first instruction set architecture and the second instruction set architecture to form a recoded instruction having at least Y-bits.

30. The computer readable storage medium of claim 29, wherein each instruction of the first instruction set architecture has 16-bits and each instruction of the second instruction set architecture has 32-bits.

31. The computer readable storage medium of claim 29, wherein the first instruction set architecture includes an expand instruction used to enlarge an immediate field of an expandable instruction of the first instruction set architecture, and wherein the first recoder passes at least one bit of the expand instruction to the second recoder thereby allowing the second recoder to recode the expandable instruction.

32. The computer readable storage medium of claim 31, wherein the at least one bit of the expand instruction is concatenated to at least one bit of the expandable instruction.

33. The computer readable storage medium of claim 29, wherein the first instruction set architecture includes a mode-switching instruction that switches the operating mode of the processor, and wherein the first recoder passes one or more bits to the second recoder thereby allowing the second recoder to recode the mode-switching instruction.

34. The computer readable storage medium of claim 33, wherein the one or more bits are concatenated to at least one bit of the mode-switching instruction.

35. The computer readable storage medium of claim 27, wherein the first instruction is used to enlarge a field of the second instruction and the information is at least one bit of the first instruction.

36. The computer readable storage medium of claim 35, wherein the first instruction is an expand instruction, the second instruction is an expandable instruction, and the field is an immediate field.

37. A method for recoding instructions for execution by a processor, comprising:

(a) fetching an expand instruction belonging to a first instruction set architecture and an expandable instruction belonging to the first instruction set architecture;
(b) dispatching the expand instruction to a first recoder configured to map an instruction from one instruction format to another instruction format and the expandable instruction to a second recoder configured to map an instruction from one instruction format to another instruction format;
(c) generating at least one information bit based on the expand instruction; and
(d) recoding the expandable instruction using the at least one information bit generated to form a recoded instruction belonging to a second instruction set architecture.

38. The method of claim 37, wherein step (a) comprises:
(i) fetching the expand instruction during a first clock cycle of the processor; and
(ii) fetching the expandable instruction during a subsequent clock cycle of the processor.

39. The method of claim 37, wherein the at least one information bit based on the expand instruction is generated during a first clock cycle of the processor, and the expandable instruction is recoded during a second clock cycle of the processor.

40. The method of claim 39, further comprising a step between steps (c) and (d) of:
storing the at least one information bit in an information storage buffer.

41. A method for recoding instructions for execution by a processor, comprising:
fetching a plurality of instructions from an instruction cache, wherein the plurality of instructions includes a first instruction belonging to a first instruction set architecture and a second instruction belonging to the first instruction set architecture;
dispatching the first instruction to a first recoder that maps an instruction from one instruction format to another instruction format and the second instruction to a second recoder that maps an instruction from one instruction format to another instruction format; and
recoding the first instruction and the second instruction within a single clock cycle so as to form recoded instructions belonging to a second instruction set architecture for each of the first instruction and the second instruction,
wherein the recoding of the second instruction is performed using information from the first recoder.

42. The method of claim 41, further comprising:
forwarding at least one bit from the first recoder to the second recoder, wherein the at least one bit is used by the second recoder to perform a recoding operation.

43. An instruction fetch unit for a processor, comprising:
a plurality of recoders that operate in parallel, each recoder mapping an instruction from one instruction format to another instruction format,
wherein the recoders recode instructions belonging to a first instruction set architecture within a single clock cycle so as to form recoded instructions belonging to a second instruction set, and
wherein one of the recoders recodes one instruction using information from another recoder.

44. The instruction fetch unit of claim 43, wherein the information includes at least one bit.

* * * * *